United States Patent [19]

Howell

[11] 4,207,969
[45] Jun. 17, 1980

[54] WET DISC FRICTION DEVICE

[75] Inventor: Robert V. Howell, Fort Worth, Tex.

[73] Assignee: Robert Howell Industries, Fort Worth, Tex.

[21] Appl. No.: 553,068

[22] Filed: Feb. 25, 1975

Related U.S. Application Data

[63] Continuation of Ser. No. 432,943, Jan. 14, 1974, abandoned.

[51] Int. Cl.$^2$ .......................................... F16D 65/853
[52] U.S. Cl. ............................... 188/71.6; 188/106 P; 188/264 E; 188/264 P; 188/271; 192/113 B
[58] Field of Search ................. 188/72.1, 71.6, 264 E, 188/106 P, 271, 264 P, 264 CC; 192/113 B

[56] References Cited

U.S. PATENT DOCUMENTS

| | | | |
|---|---|---|---|
| 2,518,016 | 8/1950 | Johnson et al. .................. | 188/264 E |
| 3,036,869 | 5/1962 | Crockett ...................... | 188/264 E X |
| 3,680,666 | 8/1972 | Sommer . | |

FOREIGN PATENT DOCUMENTS 367763 9/1906 France .
651876 4/1951 United Kingdom ............... 188/264 E Primary Examiner—George E. A. Halvosa
Attorney, Agent, or Firm—Cushman, Darby & Cushman

[57] ABSTRACT

A liquid-cooled heavy duty brake assembly including a number of rotor discs for cooperation with stator discs for braking an external rotating body connected to the rotor discs which is to be selectively braked. The rotors and stators are normally biased apart, but are movable toward each other along the direction of the axis of rotation of the rotor discs in order to effect braking. The casing for the assembly is closed and includes heat exchanging portions around the periphery thereof, including fins extending inwardly toward the axis of rotation of the rotor discs, and the casing is filled to less than capacity with cooling liquid. A closed circulatory loop is provided so that cooling liquid is pumped outwardly by the relative rotation of the rotor discs with respect to the stator discs, toward the heat exchanging portions of the casing, splashing thereagainst and frothing, and then passing inwardly toward the axis of rotation of the rotor discs through interior passageways formed in at least some of the stator discs.

8 Claims, 16 Drawing Figures

WET DISC FRICTION DEVICE

This is a continuation of application Ser. No. 432,943 filed Jan. 14, 1974, now abandoned.

This invention relates in general to friction devices, and more particularly to liquid-cooled disc brakes.

Among the disadvantages of many so-called "heavy duty" brake constructions is the unsatisfactory design of the friction disc components from the stand point of achieving optimum cooling; in turn, this results in the inability to effectively dissipate the high heat which is generated by severe and/or repeated brake applications. Attempts have been made to solve the high heat problem by bathing a plurality of discs in a liquid which serves as a heat-transfer medium. The heat which is absorbed by the liquid is dissipated in radiators or the like, which radiators are typically located an appreciable distance from the brake assembly; external pumps are used to circulate the liquid from the radiator to the brakes. One obvious disadvantage of such systems is that they are dependant for their operation upon the pumps, which are engine driven; any failure of the engine stops the pumps and permits the brakes to overheat, soon rendering them ineffective.

A primary object of this invention, therefore, is to provide a liquid-cooled disc brake of extremely reliable construction which is not dependant on an external pump for achieving circulation of its cooling liquid.

Another object of the invention is to provide a multiple disc brake whose efficiency actually increases if for some reason all of the cooling liquid should be lost.

A further object of the invention is to provide a braking assembly which is capable of being actuated in a conventional manner by air or hydraulic means, and also actuated by an "emergency" mechanical means, whereby the emergency braking capability is equal to 100 percent of the normal "service" braking capability.

Still another object is to provide a wet disc brake which can perform the dual function of serving as a retarder and a service brake.

Another object is to provide a brake system which is characterized as providing an extremely long service life, because the operating temperatures are kept relatively low and the friction components are operated at relatively low pressures.

Still another object is to provide a liquid-cooled braking system which does not suffer any perceptible loss in efficiency if a portion of the cooling liquid should be lost.

An additional object is to provide a heavy duty braking system for relatively small wheels (e.g., 15 inches) such as are typically used on so-called "low boy" trailers and the like, as well as relatively large wheels.

A further object is to provide a liquid-cooled disc brake which requires no external tubing or piping, such that all circulation of a cooling liquid occurs internally of a single housing.

These and other objects and advantages will be apparent from the specification and claims, and from the accompanying drawing illustrative of the invention.

Figure 1:
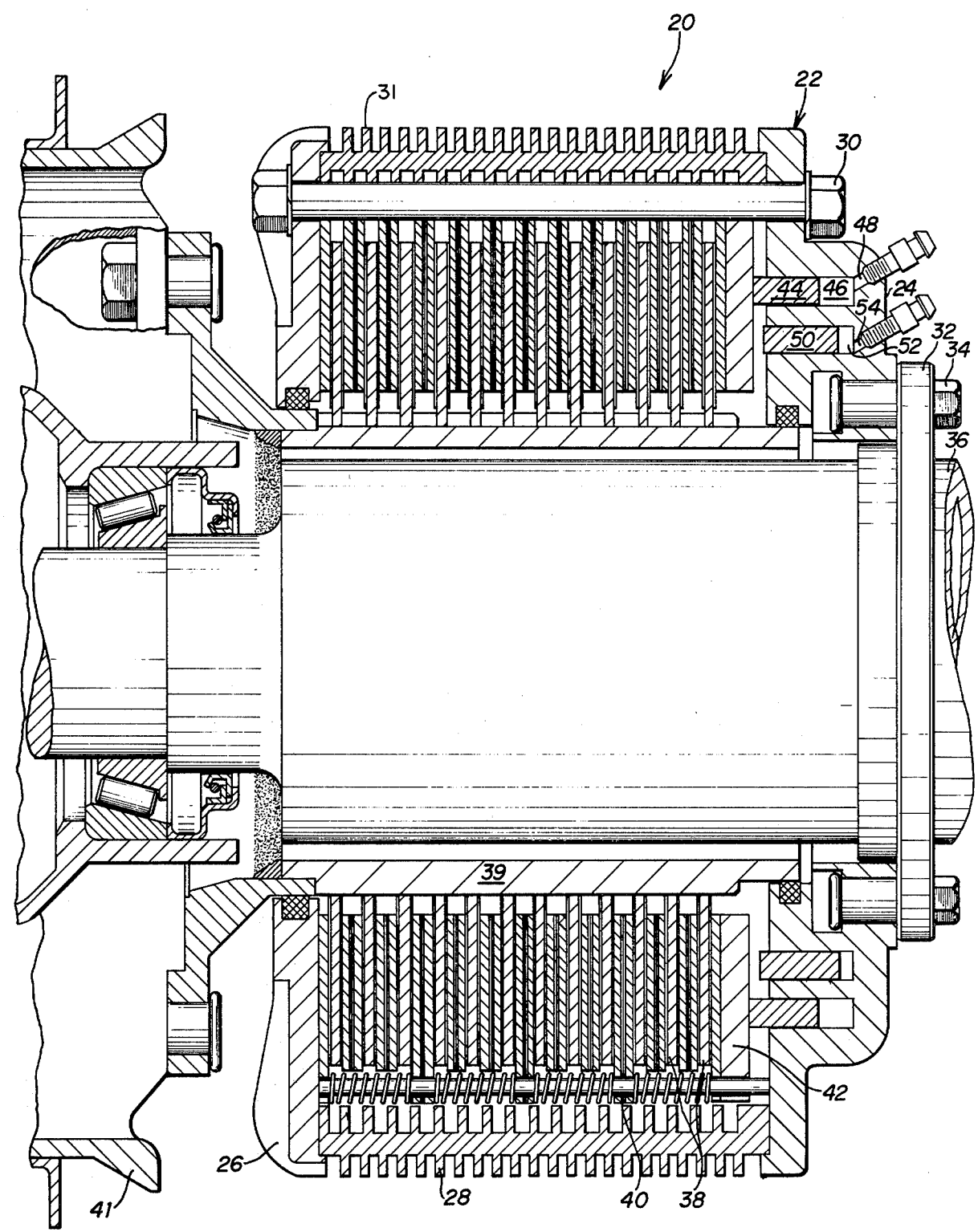
FIG. 1 is a vertical cross-sectional view through a typical heavy duty disc brake constructed in accordance with this invention.

Based on a casual glance, the disc brake shown in FIG. 1 might appear to be rather similar to prior art brakes. However, it is particularly difficult in drawings to illustrate a very distinguishing characteristic of the subject invention, namely, that the cooling liquid which is placed within the brake housing does not completely fill said housing. This is further complicated by the fact that the cooling liquid which is employed in this invention actually has two physical forms, namely, what may be called a pure liquid form, and a second form in which significant air is entrapped in the liquid so that it becomes a froth. Also with regard to the drawings, it is worthy of mention that there are no external radiators which are shown to be connected with the brake housing of FIG. 1. It should be remembered, however, that the drawings and the following description are intended to be exemplary and not limiting. Accordingly, for a person to employ external radiators—if they are not really needed—should not necessarily be construed as deviating from the present teachings and foregoing the benefits thereof.

In brief, one form of the invention comprises a liquid-cooled disc brake assembly in which a plurality of rotor and stator discs are interleaved, with the rotor discs being externally connected by an axle or the like to some rotating body which is to be selectively braked. The rotor and stator discs are sealed within a housing, and a cooling liquid is held captive within the housing. The cooling liquid does not completely fill the housing cavity, but rather occupies only a portion of the sealed interior space, preferably about one-third of said space, so that there is an appreciable amount of air in the housing. In a typical embodiment of the invention, the stator discs are notable in that they have a plurality of passages which extend radially through each disc. Surface grooves are provided on the external surfaces of the rotor discs, such that the cooling liquid will be thrown (or "pumped") radially outward during braking action. The high velocity liquid at the perimeter of the discs is then transformed into a peripheral liquid at a high pressure; the internal passages in the stator discs permit high pressure liquid at the periphery to force some of the liquid radially inward of the stator discs, until it exits near the center of the discs. The liquid which lies between a stator and a relatively moving rotor then is pushed outward, such that continuous circulation of the cooling liquid is induced. The action of slinging the cooling liquid off of the periphery of a rotating disc, followed by subsequent impact of that liquid against the interior wall of the housing, entrains some of the captive air and creates a froth or foam, which actually is more efficient at transferring heat from the disc than is a plain liquid; hence, previously known brake-cooling liquids (which usually include anti-frothing agents) are advantageously avoided. To enhance heat transfer between the liquid and the housing, and to increase the frothing action, a plurality of projections (or grooves) are ideally provided on the interior wall of the housing, such that the droplets of liquid which are thrown from a disc will not always strike simply a flat surface, but more likely will strike an irregular surface.

In one embodiment of the invention, two means are provided for forcing the rotor and stator discs together, with one means typically being a convention fluid (e.g., hydraulic) means and the additional means being either mechanical or electrical. The additional means may be denominated as an emergency braking system, although it is equally as effective as the primary system, and hence is not an inferior system—as are most so-called "emergency" systems. The use of dual (or even triple) actuating means is permitted by employing a pressure ring which is axially movable in response to two (or more) parallel elements.

Referring now specifically to FIG. 1, a generally cylindrical housing 22 is provided which is adapted to be sealed for the retention of a cooling liquid. The hollow housing is formed by inside wall 24, outside wall 26, and an annular ring 28; the housing is adapted to surround a rotative member which is to be selectively braked, such as the wheels of a truck or trailer. The walls 24, 26, and 28 are held together in this embodiment by bolts 30, such that they form a liquid-tight unit when appropriate seals are provided. As is common in vehicle applications, a mounting plate 32 is rigidly mounted on an axle housing 36, typically by welding or the like. Bolts 34 are employed to hold the cylindrical housing 22 rigidly against the axle housing 36.

Mounted for rotation inside the cylindrical housing 22 are a plurality of rotor discs 38. The discs 38 are adapted to translate or "float" axially within the housing, and also to rotate along with a rotating sleeve 39 by virtue of interlocking projections in the discs 38 and the sleeve 39. The sleeve 39 constitutes a portion of structural means for connecting the rotor discs 38 to an external rotating body which is to be braked, e.g., the wheel 41. Interleaved with the rotor discs 38 are a plurality of stator discs 40, said stator discs being mounted such that they may move axially within the housing, but they are held against rotation by means such as bolts 30.

A pressure ring 42 is provided to selectively force the discs 38, 40 together, whereby the stator discs can inhibit rotation of the rotor discs. In the embodiment of FIG. 1, two means for axially forcing the discs together are shown. The first means comprises an actuating ring 44 which is adapted to slide within groove 46 in wall 24. When the bottom of groove 46 is pressurized by admitting a pressurized fluid through passage 48, the actuating ring 44 is caused to move axially (to the left in FIG. 1) and bear against the pressure ring 42. Obviously, appropriate seals are provided to keep the pressurized fluid in chamber 46 from migrating around ring 44 and mixing with a cooling liquid which wets the discs 38, 40. The second means for axially forcing the discs 38, 40 together comprises actuating ring 50 which sealingly slides in groove 52 when pressurized fluid is admitted to the groove through passage 54. It will be seen that either actuating ring 44 or actuating ring 50 can be employed to press against pressure ring 42, but the two actuating rings can operate completely independent of one another.

Figure 2:
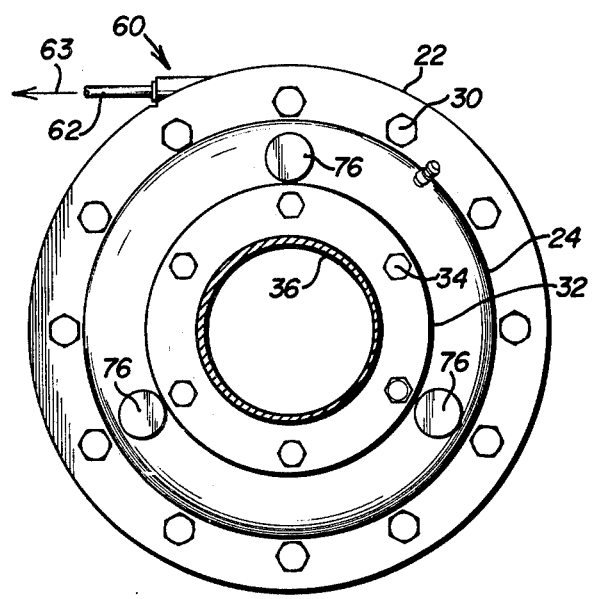
FIG. 2 is an elevation view of a brake housing seen from the inboard side of the brake, illustrating three means by which the discs might be forced together, namely, hydraulic, mechanical, and electrical means.
Figure 3:
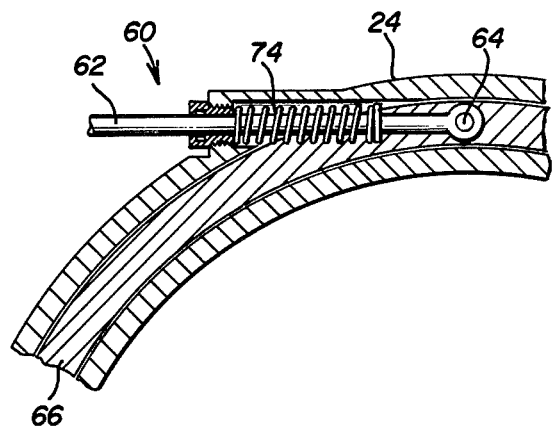
FIG. 3 is a partial sectional view of part of the mechanical means for actuating the brake.
Figure 4:
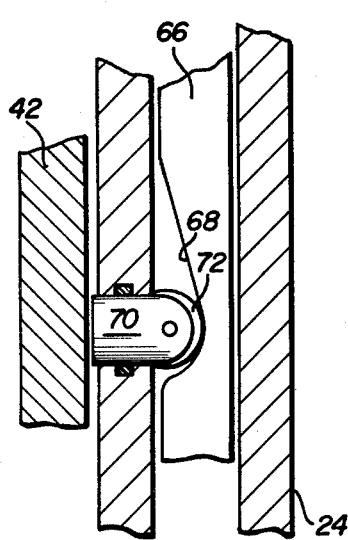
FIG. 4 is a fragmentary sectional view of the mechanical actuation means, taken perpendicularly to the view of FIG. 3.

Referring next to FIG. 2, a mechanical means and an electrical means are generally represented in locations they would typically occupy on the housing 22 for the purpose of forcing the discs 38, 40 together. Referring additionally to FIG. 3, the mechanical means 60 includes a rod 62 which is selectively movable in a direction indicated by arrow 63, in response to some activity by the vehicle operator. For example, rod 62 may be connected at one end to a foot pedal in a vahicle cab through various cables and/or linkages, such that a tension force may be established in the rod 62. Rod 62 is connected at its other end to ring 66 by pin 64. Moving the rod 62 in the direction of arrow 63 will cause ring 66 to rotate counter-clockwise in a groove in wall 24. Referring additionally to FIG. 4, at two, three or more equally spaced positions around ring 66 are cam surfaces 68 and floating pins 70 which are adapted to engage the cam surfaces 68 with rollers 72. Referring specifically to FIG. 4, it will be seen that movement of ring 66 to the left will cause pin 70 to ride upward along cam surface 68 until the pin bears against pressure ring 42. Continued movement of ring 66 to the left will then cause ring 42 to move axially (that is, to the left), thereby forcing the discs 38, 40 together. When tension in rod 62 is relaxed, a return spring 74 around rod 62 causes the ring 66 to be rotated clockwise, and the pressure of ring 42 against the discs is relieved. Although the above-described mechanical means for forcing the discs together may be denominated as a "back-up" or "emergency" system, it is worthy of note that the same number of square inches of braking area in the discs is available, and the "emergency" braking capability is equal to 100 percent of the normal "service" braking capability.

Figure 5:
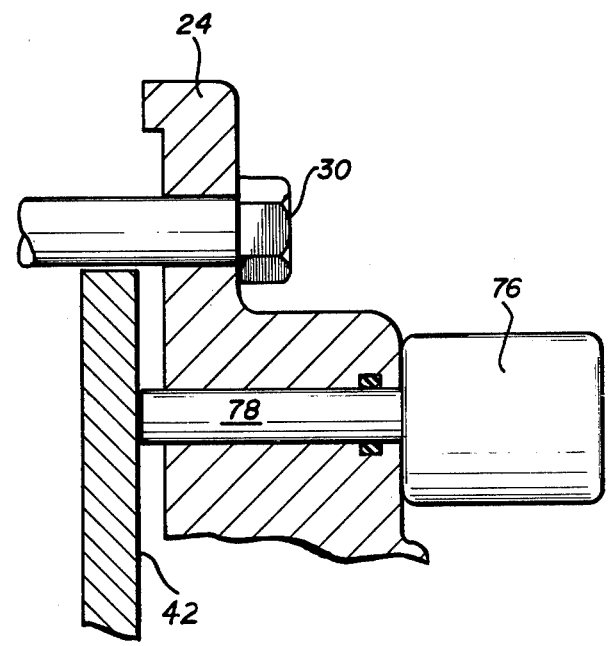
FIG. 5 is a fragmentary sectional view taken similarly to FIG. 1, and showing how an electrical solenoid may be mounted in order to force the discs together.

Referring now to FIG. 5, an electrically operated means for forcing the discs toward one another is illustrated. Said means comprises a plurality of solenoids 76 which are spaced around the end wall 24 and elecrically connected such that their plungers 78 will act in unison to bear against pressure ring 42, whereby the discs 38, 40 may be pressed together. Of course, contact between a given solenoid and the pressure ring 42 need not be directly through plungers 78; other linkages (such as scissor linkages) can be advantageously employed to apply an evenly distributed bearing force against the discs 38, 40.

Figure 6:
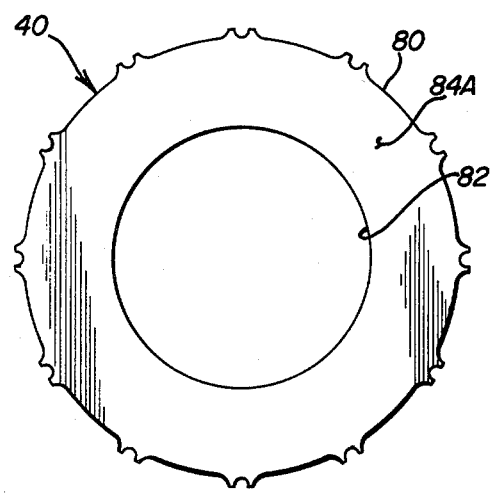
FIG. 6 is an elevational view of the outside surface of a stator plate of the invention.
Figure 7:
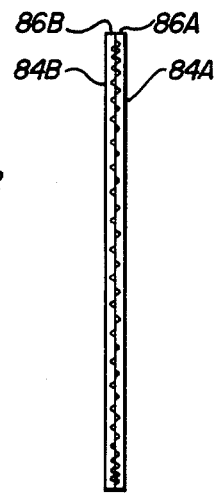
FIG. 7 is an edge view of one embodiment of a stator plate of the invention, showing how radial grooves typically terminate at the edge of a plate.
Figure 8:
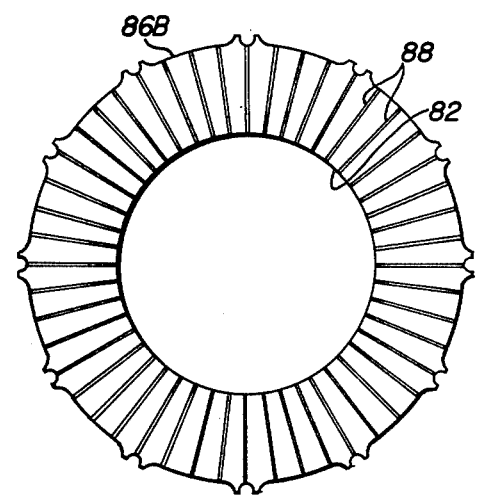
FIG. 8 is an elevational view of a stator of the invention, showing an exemplary inside surface. The grooved surface is such as can be obtained with a coining or other metal-upsetting machine.

Referring now to the specific construction of the stator discs 40, an exemplary disc is shown in FIG. 6, wherein the disc may be seen to have an external periphery 80 and a central aperture 82; on each side of the disc between the periphery and the central aperture is a wear surface, with one of said wear surfaces (84A) being shown in FIG. 6. The embodiment of a stator disc shown in FIG. 6 will be representative of all such discs, since the exterior surfaces of all discs will typically be the same. An edge view of a stator 40, however, will reveal that there are many ways in which a plurality of internal liquid passages may be provided between the two wear surfaces 84A and 84B. For example, the embodiment of a stator 40 shown in FIG. 7 includes a first plate 86A and a second plate 86B, which plates may even be identical. The frontal view of the plate 86B shown in FIG. 8 reveals that it includes a plurality of radial grooves 88, each of which grooves extends from the external periphery to the central aperture. When two plates such as the ones shown in FIG. 8 are juxtaposed face to face, they leave internal passages such that a liquid in which the disc 86 is bathed may pass internally in response to a pressure differential. Preferably, the cross-sectional area of each of the internal passages is at least 0.004 square inch. A suitable material for a stator of FIG. 6 is AISI 4000-Series Steel; no additional wearing material need be affixed to any such steel rated for high service temperatures.

Figures 9, 10, 11A, 11B:
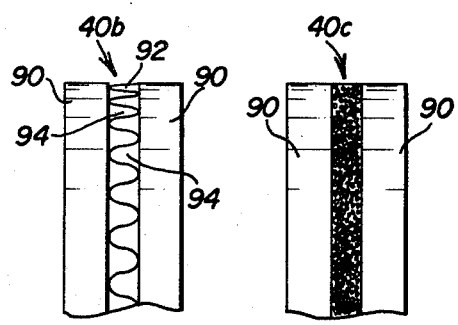
FIG. 9 is an enlarged fragmentary view of an edge of a stator created by two planar elements and a "sandwiched" non-planar element.
FIG. 10 is a view similar to FIG. 9 showing a stator with a porous core, through which a cooling liquid can circulate.
FIGS. 11a and 11b are enlarged fragmentary edge views of a stator such as the one shown in FIG. 7, with one view showing the internal grooves of juxtaposed plates aligned.
Figure 12:
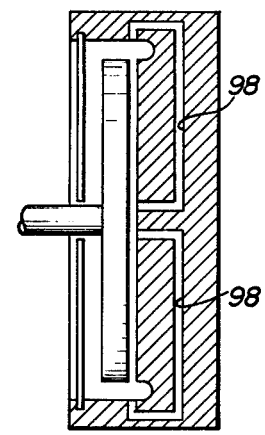
FIG. 12 is a diagramatic view of a brake wherein passages for circulation of the liquid extend through a portion of the brake housing.
Figure 15:
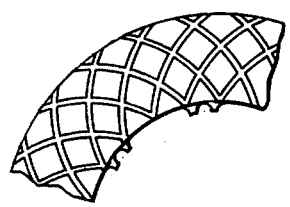
FIG. 15 is a fragmentary elevation view of the exterior surface of a preferred rotor disc, utilizing what is commonly called a "sun burst" design for the grooves in the wear surface of the rotor.

An alternate embodiment of a stator disc 40B is shown in FIG. 9, wherein two planar plates 90 are juxtaposed, with a non-planar centerpiece 92 provided therebetween. Internal passages 94 exist in the disc 40B by virtue of the gaps between the inside faces of the two plates 90, 90 and the centerpiece 92. The centerpiece 92 may be manufactured by taking a generally annular-shaped piece of metal and corrugating it (radially) or otherwise shaping it in any well known manner. FIG. 10 illustrates another embodiment of a stator 40C in which two planar elements 90 are separated by a porous core 96; naturally, the interstices within the core are designed to provide sufficient permeability for permitting a cooling liquid to pass from the periphery of a disc to near its center. FIGS. 11A and 11B illustrate other embodiments wherein substantially planar elements have been machined or coined to provide internal grooves through which the cooling liquid may pass. If the grooves on opposite plates are aligned as shown in FIG. 11B, the effective passage space through the stator plate will be larger, and liquid will flow therethrough with greater ease. Such critical alignment may increase the manufacturing costs, however, so it is preferred that each of the passages be adequate to permit liquid to flow therethrough; hence, the respective plates could have the orientation shown in FIG. 11A without interfering with the requisite flow of liquid. It is also possible that when there are a plurality of stator plates, not every one of them need necessarily have a liquid-permeable core—if the braking requirements are not too severe. Thus, it may be possible to alternate stators of this invention (having permeable cores) with conventional stators, as long as there is sufficient flow through the permeable stators to adequately cool the brake. In other applications it may be desirable to increase the flow by, for example, providing a static flow channel through the housing 22, in order that liquid pumped outwardly by the rotating discs may circulate through the housing back to the low-pressure region near the axle. An example of such an embodiment is shown in FIG. 12, wherein a rotor disc 38 is adapted to be selectively forced against an interior surface of the housing, and flow passages 98 through the housing permit continuous circulation of the cooling liquid. Obviously, the more numerous and more evenly distributed such passages 98 are, the more evenly heat will be distributed in the housing. Hence, to avoid a tendency toward creating "hot spots", a large number of static passages 98 are advantageously provided.

Figure 13:
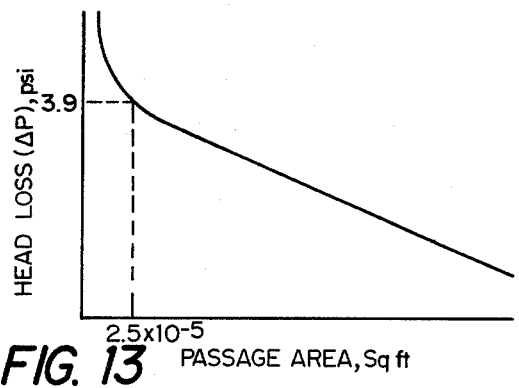
FIG. 13 is a plot of head loss versus cross-sectional area of a liquid passage, showing that the size of each liquid passage ideally should be at least $2.5 \times 10^{-5}$ square feet in order to keep losses low.

A requirement that the flow passages for the cooling liquid be at least 1/16 inch or so in diameter can be justified by reference to FIG. 13, which is an approximate plot of head loss versus passage size. It will be seen that if the passage area is much less than 0.000025 square foot (i.e., 1/16 inch in diameter) the head loss begins to rise asymptotically. Calculations upon which the curve of FIG. 13 were based included: a flow velocity of 41 feet per second, Reynold's Number of 4.74, fanning friction factor of 13.8, and a specific gravity for the oil of 0.855 at 325° F.

With particular attention now to the liquid with which the brake can be cooled, it should be remembered that prior art cooling liquids typically have had additives therein to inhibit foaming or frothing, etc. Such additives include: lauric acid ($C_{12}$ acid), stearic acid ($C_{18}$ acid), hexoic acid ($C_5H_{11}$ COOH), and behenic acid ($C_{21}H_{43}$ COOH). In contrast to prior art cooling liquids, a preferred liquid to use in a brake of this invention is Shell's commercially available THERMIA-33, an oil designed for use in electric transformers which is characterized as exhibiting great stability at high temperatures and having no additives except an anti-oxidation additive. Other highly refined hydrocarbons which possess what are usually called "high temperature characteristics" probably would also be servicable. For example, a di-ester based mineral oil (a non-petroleum product) would also be servicable. Those products which are not satisfactory, however, are light hydrocarbons such as automobile transmission oils; under certain conditions the combination of high temperatures, agitation, and high pressures tend to drive light hydrocarbons toward their ignition points, which obviously is to be avoided. A satisfactory cooling liquid may be best distinguished from one which is not servicable by reference to the Viscosity Index of the liquid; those liquids which are satisfactory will have an Index of at least 90 (according to Saybolt test method). If a porous ceramic core is employed in a stator construction, it may also be prudent to verify that the proposed cooling liquid is compatible with the ceramic. The aforementioned THERMIA-33 (which is refined from sweet crude oil) is compatible with those ceramic materials which might reasonably be used in a stator "sandwich", e.g., Forsterite ($Mg_2 SiO_4$), Clinoenstatic (MgO $SiO_2$), Mullite ($3Al_2 O_3 \cdot 2SiO_2$), and Nickel Spinel (NiO $Al_2 O_3$).

Figure 14:
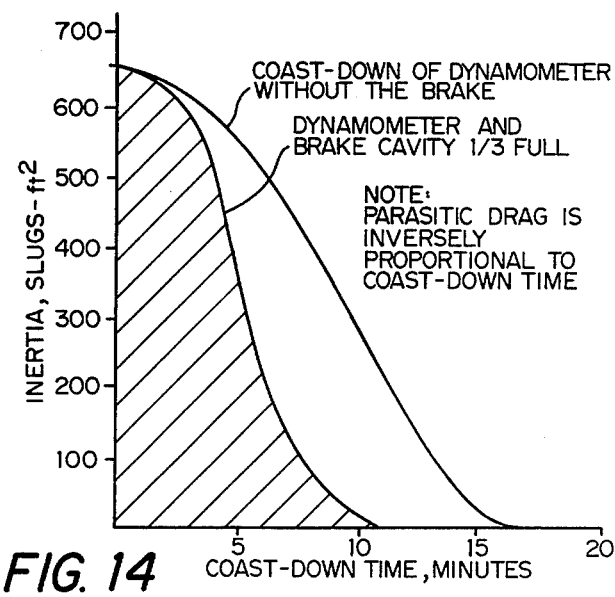
FIG. 14 is a plot showing the coast-down time when the brake cavity is empty and also when it is ⅓ full of cooling liquid. The hatched area represents conditions when the brake cavity is more than ⅓ full.

In operation of the invention, the cavity of a dry brake housing is partially filled with a suitable liquid, which has been described above. In a typical brake housing for a "low boy" trailer having 15 inch wheels, a quantity of about 2½ pints would be an expected "charge" to cause the cavity to be approximately one-third full. It is preferred that the liquid comprise no more than about one-half of the capacity of the cavity, because—for one reason—parasitic drag can become a problem if the cavity is too full. Filling the cavity to approximately one-third full has been found to be an optimum amount, although a tablespoon full would still be operable in a brake which would usually accommodate 2½ pints. The reason that even a very small amount of liquid will still be servicable is that at least some of the liquid is turned into a foam as it is agitatated between relatively moving surfaces; the foam will inherently fill the cavity, thereby providing a medium for the transfer of heat between the stator and rotor discs and the housing. The parasitic drag curve shown in FIG. 14 presents dynamometer test data for a brake with the cavity one-third full. If the cavity is more than ⅓ full, the elapsed time to "stop" would be reduced because the drag would be increased.

In order to promote the generation of a foam in the housing cavity, it is preferred that the rotor disc 38 be designed so that its periphery is at least one-quarter inch radially from the interior wall of the housing 22, so that droplets of liquid which are initially thrown from a rotating disc will pass through a significant air space before impinging on the interior wall 28. Preferably, there is about one-half inch clearance between the nearest projection extending inwardly from the wall 28 and the periphery of the rotor discs 38. To increase the heat transfer characteristics of the cooling liquid, it is also preferred that the interior wall 28 be grooved as shown in FIG. 1. One feature of such grooving is that it increases the internal surface area which will be in contact with a captive liquid. Another result is that at least some droplets of liquid which are thrown from a rotating disc will likely strike some portion of the wall other than a flat surface, whereby the entrainment of air is enhanced.

To further increase heat transfer away from the brake 20, it is preferable to make the housing 22 from a material like aluminum and provide a plurality of external heat-exchanging fins 31, whereby the transfer to the air of such heat as is generated during braking is fostered. If the brake has not been in service for several hours, as would typically be the case on a vehicle which has been parked, it is possible that maybe all of the cooling liquid will have collected in the bottom of the housing cavity. The very first rotation of a rotor disc 38, however, will begin to carry the cooling liquid upward and splash it around in the cavity, such that at least some froth should be very quickly generated; for this reason, the brake may be denominated as a "self-priming" brake. Thus, the entire cavity of the housing will not remain dry for long, if there is any liquid at all in the cavity. It will be possible for the brake to serve its intended purpose, however, even if all of the liquid should be accidentally removed from the cavity or lost. In fact, if the disc brake 20 is operated with no liquid in the cavity, the stopping capability of the brake is actually improved, since the liquid (when present) serves as a lubricant between the relatively moving surfaces. While the braking efficiency may improve when the housing is dry, the longevity of the discs will be definitely reduced, and operating the brake in a dry condition is not recommended for those who would like their braking system to last as long as possible. For a trucker on the road, however, it will probably be comforting to know that he could safely drive his truck to any nearby town rather than waiting for a service truck to drive to him—if the cooling liquid should be lost.

When the vehicle on which the brakes 20 are mounted first begins to roll, there is relatively little viscous drag in the liquid between respective rotor and stator discs, since springs 35 tend to hold the respective discs apart. As shown in FIG. 1, there are four springs 35 which bear respectively against every fourth stator disc 40. There will typically be four, equally spaced sets of such springs 35 in a "low boy" trailer brake. When it is desired to stop the vehicle, one means for axially forcing the discs toward one another is activated, thereby overcoming the biasing force of the springs 35.

It should be noted that all of the heat generated between relatively moving discs in a brake is transferred to its *own* brake housing, and there is no inter-connection between various brakes—except for the "signaling" means through which the brakes are selectively actuated. This lack of inter-connection between brakes should be mentally contrasted with prior art systems where all of the cooling liquid in all brakes on a vehicle is circulated by a pump through piping and a common radiator, and the internal temperatures of all such brakes will be basically the same. While it is naturally hoped that the one common temperature of such prior systems will be relatively low, e.g., 200° F., there is no safety "lock out" if one of the brakes should begin to fail and overheat. With the instant invention, on the other hand, each brake housing constitutes its own radiator, and an inordinate increase in the temperature of one brake housing will not affect a remote housing. Furthermore, the accidental rupture of one brake housing (with its attendant loss of cooling liquid) does not cause any change in the operation or efficiency of the other brakes.

Because each brake housing (be it made of aluminum, magnesium or some other material having high heat transfer characteristics) serves as its own independent radiator, there are many places—other than vehicles—where a brake of the present design can be particularly advantageous. Thus, in places where vibration or safety may impose very strict requirements on equipment, a brake of the present invention can be very advantageous. It may also be selected more as a matter of choice rather than necessity—for economy reasons, etc. Examples of mechanical equipment where the instant brake may find utility include punch presses and other metal working machines, hoisting drums, elevators, oil well drilling platforms, etc.

With regard to the liquid circulation phenomenon, the results of certain dynamometer tests will no doubt help support the previous statement that the cooling liquid is indeed "pumped" outwardly between the relatively moving discs when they are engaged. Using the requirements of a U.S. Motor Vehicle Safety Standard (FMVSS) No. 121 as an example, the total work performed in stopping an 80,000 pound truck from an initial speed of 50 mph is first calculated; this is given by the formula:

$$E = \frac{WV^2}{2g(778)} = \frac{80,000\,(50)^2}{30\,(778)} = 8,625 \text{ Btu}$$

According to prior experience with four brakes, each having 15 rotor discs with 48 radial grooves on each side (for a total of 5760 pumping grooves), it is assumed that there will be pumped about 165 gallons of cooling liquid per minute. Assuming further a weight of 7.5 lb/gal for the liquid, and an elapsed time of five seconds to stop the truck, there will be pumped about 102 pounds of liquid. If the liquid has a specific heat of 0.4 BTU/lb° F., there should theoretically be about a 210° F. temperature rise in each brake. Actual dynamometer tests have shown temperature rises ranging from 250° F. to 300° F., which compares favorably with the theoretically calculations (based on 100 percent efficiency, no losses, etc.). Hence, the assumptions based on circulation of the cooling liquid by "pumping" between the grooved rotors and the stators is well supported. It is believed to be interesting, too, that at the conclusion of the tests and after the brake housing had cooled somewhat, when the sealed cavity was opened, some of the cooling liquid was still foamy or frothy, looking (as some have said) like the ideal matter for a soap bath.

While it is true that the operating temperature of the instant brake may be higher than is common with prior vehicle brakes, this is not a problem since high temperature seals can be installed as standard seals. Such seals (employing Teflon cups and the like) are commercially available, and so sealing poses no handicap to exploitation of the invention.

Another characteristic of the brake of the invention, in contrast to prior art brakes, is that the cooling liquid is very evenly distributed around what may be denominated as the "low pressure" chamber near the axle. With reference again to FIG. 8, it will be noted that cooling liquid will be flowing from the "high pressure" region (adjacent the periphery) toward the center of the disc from directions spaning a full 360°—such that local "hot spots" are generally precluded; and, while grooves are certainly provided in the embodiment of FIG. 8, the flow of cooling liquid will be akin to flow along a free or unrestricted path, since there are no seals which rigidly constrict the fluid to the grooves. Indeed, it is the "free path" characteristic of the flow to the low pressure region that very clearly distinguishes the flow of the present brake from prior devices. By use of the term "free path" it is intended to suggest flow such as would occur if liquid were allowed to simply flow across a horizontal sheet—in contrast to the flow that obtains when liquid is forced to travel only through tubes or pipes. The flow need not necessarily be "free" however, since it might be possible in some situations to substitute a few, large tubes or passages for the multitude of small passages. Naturally, the most severe braking requirements that could ever be expected would dictate the requisite flow of cooling liquid, which would in turn dictate the size and quantity of passages. Distribution of the flow passages is also an important consideration, since it is desirable to prevent localized hot spots as well as providing a total flow equal to the calculated liquid flow requirement. It is believed that the need for reasonably uniform cooling of the discs and circulation of the cooling liquid will dictate that at least four static passages be provided, with the four being respectively separated by 90°. If, however, cooling should ever be attempted with only three relatively large static passages, they should naturally be spaced 120° apart. If manufacturing considerations should for some reason make a few passages of large size more desirable than many passages of small size, it would be advisable to mount a plurality of stator plates such that their passages are respectively offset . . . as seen from one end of the brake. That is, tilting every other stator by, say, an angle equal to one-half of the angle between adjacent passages in a given stator, would help compensate for having relatively few passages per stator. In any configuration, it should be remembered that ideally the passages should be of a size and quantity, and be so distributed, as to convey liquid within the housing in such a way that essentially all of the brake is maintained at a substantially uniform temperature.

While only a preferred embodiment and certain verifications of the invention have been disclosed in great detail herein, it will be apparent to those skilled in the art that modifications thereof can be made without departing from the spirit of the invention. Thus, the specific structure shown herein is intended to be exemplary and is not meant to be limiting, except as described in the claims appended hereto.

What is claimed is:

1. A liquid-cooled disc brake assembly comprising:
   (a) a casing having a quantity of liquid disposed therein less than the liquid capacity of said casing, said casing being sealed for retention of said liquid quantity and operable to continuously retain said liquid quantity therein,
   (b) a plurality of rotor discs mounted for rotation with respect to said casing about an axis of rotation within said casing,
   (c) means for connecting said rotor discs to an external rotating body whch is to be selectively braked,
   (d) means for mounting said rotor discs for relative movement along the axis of rotation thereof,
   (e) a plurality of stator discs disposed within said housing and having essentially flat, exterior disc surfaces, said flat disc surfaces thereof being arranged perpendicular to said axis of rotation,
   (f) means for mounting said stator discs in juxtaposed relationship with respect to said rotor discs and for relative movement along the axis of rotation of said rotor discs while not allowing rotation of said stator discs,
   (g) means for biasing said rotor and stator discs to a relatively widely spaced apart position whereby no braking action is performed therewith,
   (h) heat exchanging means formed on casing portions that extend generally parallel to said axis of rotation, said heat exchanging means comprising a plurality of fins extending inwardly and outwardly from said casing and generally radially toward and away from said axis of rotation,
   (i) means for establishing a closed circulatory loop for said cooling liquid during braking so that said cooling liquid is pumped outwardly from adjacent the axis of rotation of said rotor discs toward said casing heat exchanging fins, splashing thereagainst and thereby frothing, and then is allowed to pass inwardly toward said axis of rotation in response to negative pressure adjacent said axis of rotation, and
   (j) first means for moving said rotors and stators toward each other against the bias of said biasing means to effect braking.

2. A brake assembly as recited in claim 1 wherein said casing is cast from aluminum.

3. A brake assembly as recited in claim 1 wherein the quantity of liquid contained in said casing is about one-third the maximum quantity of liquid that may be disposed in the casing.

4. A brake assembly as recited in claim 1 wherein said rotors further comprise means defining passageways in the surfaces thereof for facilitating liquid pumping action of said rotors during braking.

5. A brake assembly as recited in claim 1 further comprising second means for forcing the discs toward each other to effect braking, said second means being operatively independent of said first means.

6. A brake assembly as recited in claim 1 wherein said means for biasing said rotor and stator discs to a relatively widely spaced apart position comprise spring means.

7. A brake assembly as recited in claim 1 wherein said means for mounting said rotor discs comprise spline means.

8. A brake assembly as recited in claim 1 wherein said means for mounting said stator discs include spline means.

* * * * *